(12) United States Patent
Heitmann

(10) Patent No.: US 8,812,224 B1
(45) Date of Patent: Aug. 19, 2014

(54) METHOD AND SYSTEM FOR TRACKING ALTERNATIVE FUELED BASED TRAVEL IN ALTERNATIVE FUELED VEHICLES

(75) Inventor: Paul Heitmann, Basking Ridge, NJ (US)

(73) Assignee: Comverge, Inc., Norcross, GA (US)

( * ) Notice: Subject to any disclaimer, the term of this patent is extended or adjusted under 35 U.S.C. 154(b) by 216 days.

(21) Appl. No.: 12/848,142

(22) Filed: Jul. 31, 2010

(51) Int. Cl.
*G01F 9/00* (2006.01)

(52) U.S. Cl.
USPC ................ 701/123; 701/22; 701/99

(58) Field of Classification Search
CPC ......... G06F 19/00; G06F 21/00; B60W 20/00
USPC .............................. 701/22, 99, 123
See application file for complete search history.

(56) References Cited

U.S. PATENT DOCUMENTS

| | | | | | |
|---|---|---|---|---|---|
| 5,396,766 | A | * | 3/1995 | Sato et al. ................. | 60/276 |
| 5,568,052 | A | * | 10/1996 | Sway-Tin et al. ............ | 324/435 |
| 5,668,310 | A | * | 9/1997 | Parkman et al. ........... | 73/114.52 |
| 2002/0132144 | A1* | | 9/2002 | McArthur et al. ............ | 429/13 |
| 2004/0110044 | A1* | | 6/2004 | McArthur et al. ............ | 429/13 |
| 2005/0173523 | A1* | | 8/2005 | Yushio et al. ................ | 235/384 |
| 2006/0060162 | A1* | | 3/2006 | Fukui et al. ............. | 123/179.16 |
| 2007/0181088 | A1* | | 8/2007 | Akasaka .................... | 123/179.4 |
| 2007/0276579 | A1* | | 11/2007 | Asano ........................ | 701/103 |
| 2008/0135314 | A1* | | 6/2008 | Motoike et al. ............. | 180/65.2 |
| 2008/0154671 | A1* | | 6/2008 | Delk .............................. | 705/7 |
| 2008/0224478 | A1* | | 9/2008 | Tamor ........................ | 290/40 C |
| 2008/0309093 | A1* | | 12/2008 | Ando et al. ................ | 290/40 C |
| 2008/0318721 | A1* | | 12/2008 | Oba et al. ................... | 475/5 |
| 2009/0040032 | A1* | | 2/2009 | Gerber ....................... | 340/438 |
| 2009/0058366 | A1* | | 3/2009 | Masuda ..................... | 320/135 |
| 2009/0069999 | A1* | | 3/2009 | Bos ............................ | 701/102 |
| 2009/0093945 | A1* | | 4/2009 | Okumura .................... | 701/103 |
| 2009/0174538 | A1* | | 7/2009 | Shibata et al. .............. | 340/438 |
| 2009/0177580 | A1* | | 7/2009 | Lowenthal et al. ........... | 705/39 |
| 2009/0184689 | A1* | | 7/2009 | Kressner et al. ............ | 320/162 |
| 2009/0240388 | A1* | | 9/2009 | Harris ......................... | 701/22 |
| 2009/0277704 | A1* | | 11/2009 | Yamaguchi ................ | 180/65.31 |
| 2010/0106351 | A1* | | 4/2010 | Hanssen et al. ............. | 701/22 |
| 2010/0174484 | A1* | | 7/2010 | Sivasubramaniam et al. ........................ | 701/213 |
| 2010/0194553 | A1* | | 8/2010 | Mizutani et al. ............ | 340/438 |
| 2010/0280956 | A1* | | 11/2010 | Chutorash et al. ........... | 705/64 |
| 2011/0056185 | A1* | | 3/2011 | Bradley et al. .............. | 60/274 |
| 2011/0153131 | A1* | | 6/2011 | Kressner et al. ............. | 701/22 |
| 2011/0251754 | A1* | | 10/2011 | Jones ......................... | 701/35 |
| 2012/0019205 | A1* | | 1/2012 | Kressner et al. ............ | 320/109 |
| 2012/0025759 | A1* | | 2/2012 | Kressner ..................... | 320/108 |
| 2012/0089304 | A1* | | 4/2012 | Hamilton et al. ............. | 701/50 |

FOREIGN PATENT DOCUMENTS

WO    WO 2008065837 A1 *   6/2008

* cited by examiner

*Primary Examiner* — Khoi Tran
*Assistant Examiner* — Adam Mott
(74) *Attorney, Agent, or Firm* — Smith Risley; Steven P. Wigmore

(57) ABSTRACT

A system and method can track alternative fuel based travel in alternative fuel vehicles. The system can include an alternative fuel based odometer or "green odometer" which may track distance traveled while a hybrid vehicle, such as PHEV, is only powered by an alternative fuel or power, such as electricity. This green odometer can track credits or incentives earned since the last alternative fuel reimbursement or credit given to the vehicle owner as well as the total reimbursements or credits earned over an alternative fuel vehicle's life. The total reimbursements or credits earned over the alternative fuel vehicle's life could be used as an additional measure of intrinsic value for the alternative fuel vehicle.

14 Claims, 4 Drawing Sheets

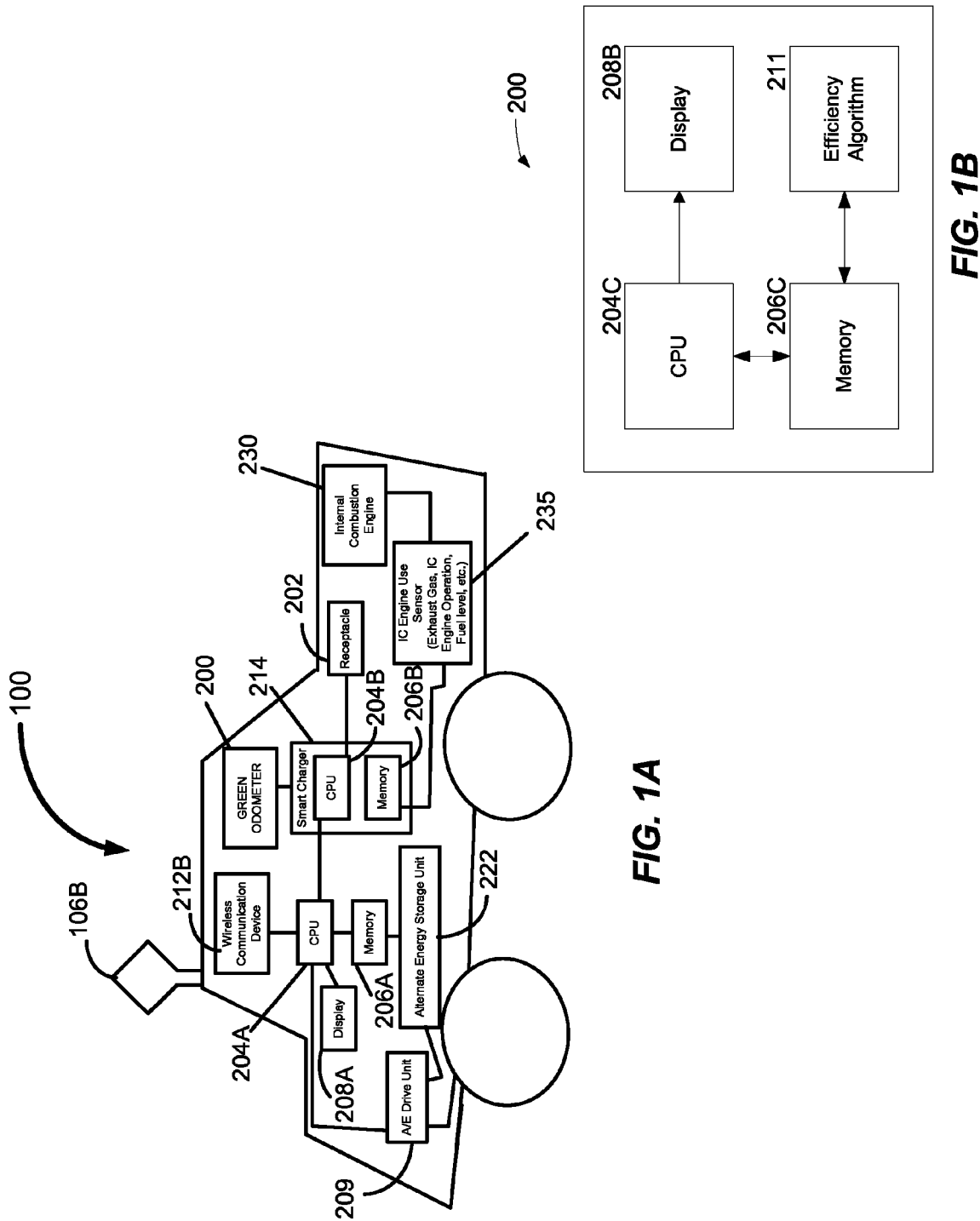

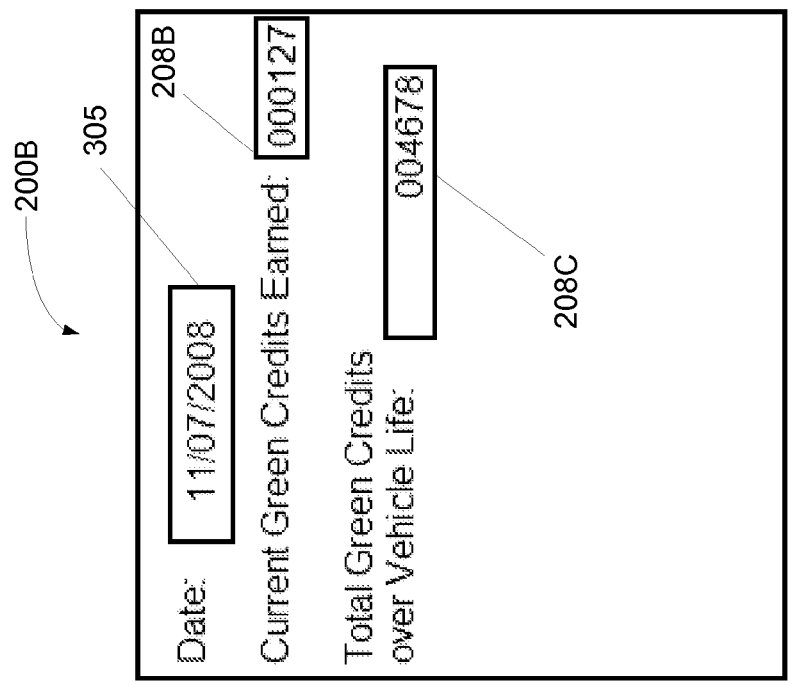
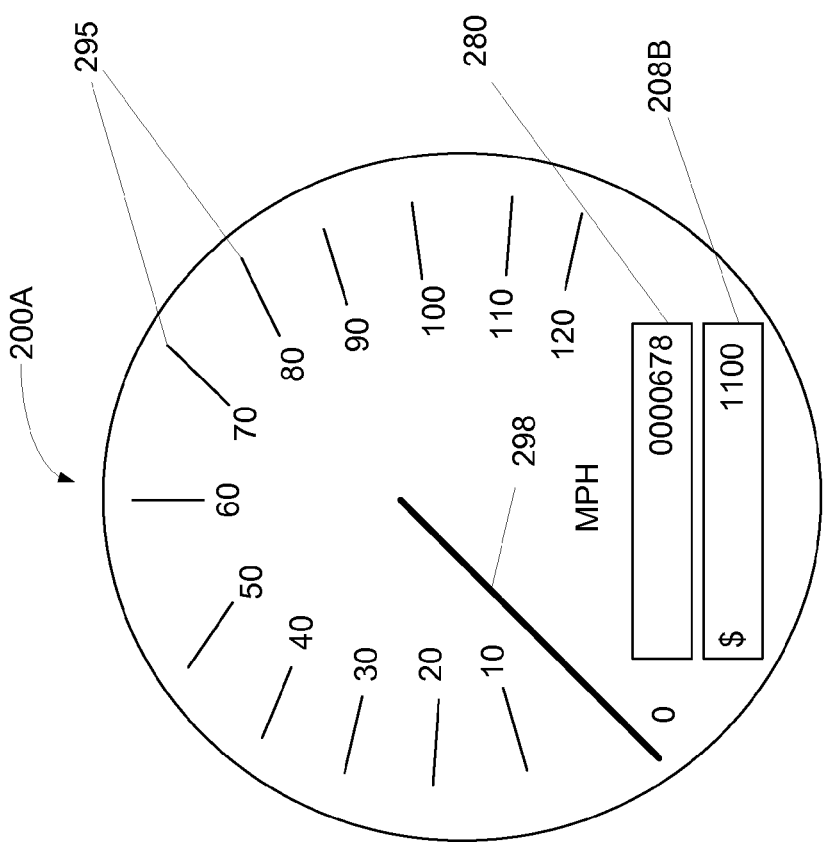
FIG. 3
FIG. 2

| Weekly Segment | e - Miles Driven | F - Miles Driven | Total Daily Miles | Weekly Credit |
|---|---|---|---|---|
| Mon | 20 | 0 | 20 | |
| Tue | 20 | 0 | 20 | |
| Wed | 20 | 0 | 20 | |
| Thu | 20 | 0 | 20 | |
| Fri | 20 | 0 | 20 | |
| Sat | 50 | 50 | 100 | |
| Sun | 50 | 50 | 100 | |
| Total | 200 | 100 | 300 | $40.00 |

FIG. 4

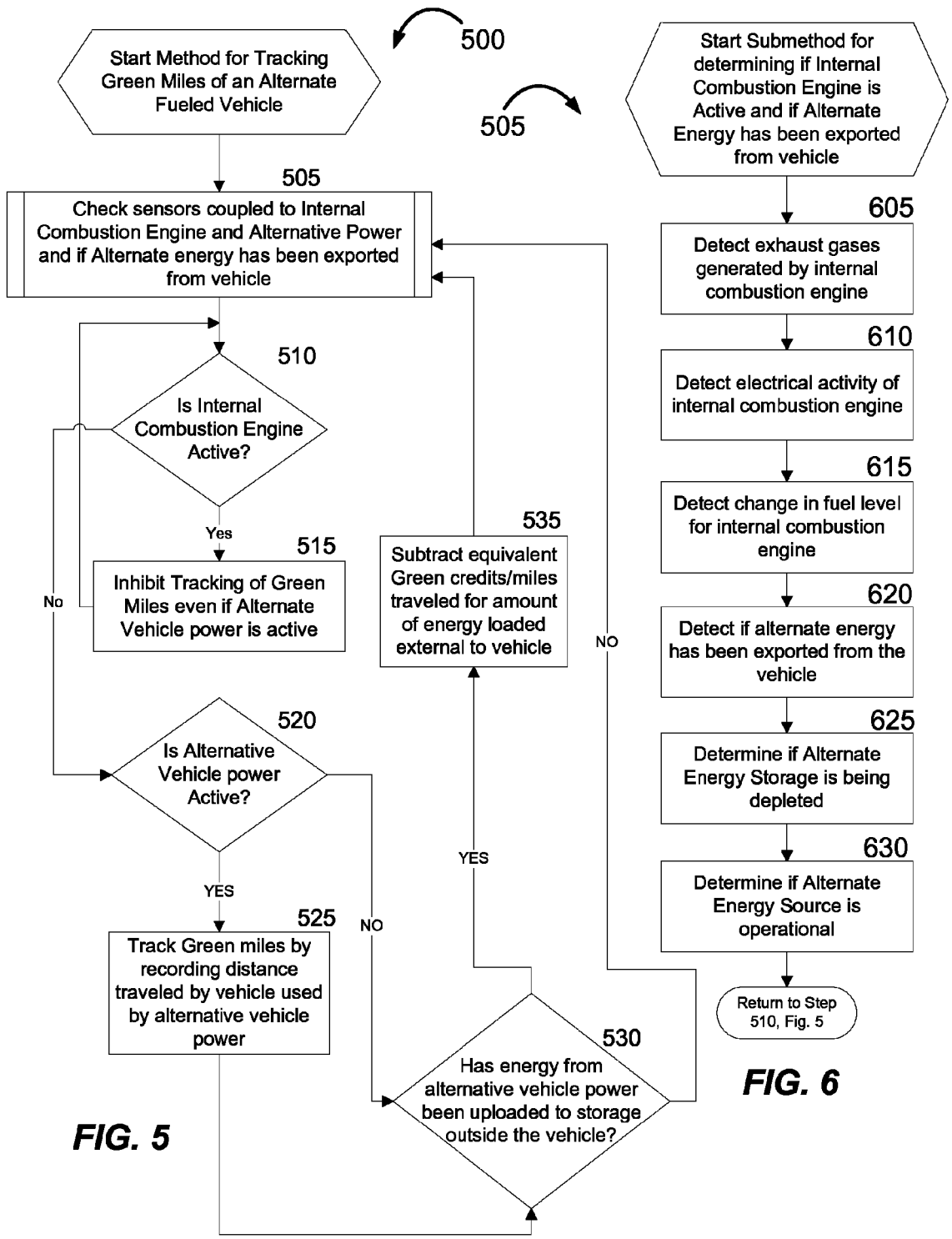

METHOD AND SYSTEM FOR TRACKING ALTERNATIVE FUELED BASED TRAVEL IN ALTERNATIVE FUELED VEHICLES

FIELD OF THE INVENTION

The invention is generally directed to alternative fueled type vehicles. The technology relates more particularly to vehicles powered by both traditional fossil fuels and non-emission based alternative fuel or power, such as electricity.

BACKGROUND OF THE INVENTION

As alternative fueled vehicles, such as hybrid electric vehicles, become more and more popular with the consuming public because of their reduced emissions and more efficient use of energy compared to vehicles powered solely by fossil fuels, there will be an increased demand for tracking the powering of vehicles when they are only using the alternative, non-emission based fuel or power, like electricity. Owners of alternative fueled vehicles, like Plug-in Hybrid Electric Vehicles (PHEVs), will soon be eligible for government and industry generated money credits that will be derived from Carbon Gas Reduction Legislation, such as Carbon Taxes or Carbon Credits.

Complete alternative fueled vehicles, which refers to vehicles that do not use any type of fossil based fuels for power like hydrogen powered or pure electric vehicles, as of this writing, are still in the design phase and are not available to the consuming public. Meanwhile, hybrid vehicles such as PHEVs, which can be powered by both fossil fuels and alternative energy like electricity, are available to consumers for immediate use.

One of the problems with hybrid vehicles, like PHEVs, is the ability to track their use when they are powered only by the alternative energy source, like electricity. Since the owner of a hybrid vehicle, in most cases, will have the choice or option to power the hybrid vehicle by either a fossil based fuel or an alternative energy source, then a need exists in the art to develop a method and system which can accurately track the time or distance driven when powered completely by an alternative energy source so that the hybrid owner is provided with a monetary incentive to power the hybrid vehicle more often with the alternative energy source compared to powering the vehicle with fossil fuel.

Another problem with tracking alternative energy consumption of a hybrid vehicle is that the total alternative energy consumed should not be the only metric tracked to provide incentives for the hybrid vehicle owner. For example, if only the total alternative energy consumed by an hybrid vehicle was tracked, then aggressive drivers of hybrid vehicles would be rewarded for inefficient use of the alternative energy. In other words, aggressive drivers who accelerate their hybrid vehicles too rapidly or who drive their electric vehicles at very high speeds would likely consume significantly more alternative energy compared to the conservative hybrid vehicle driver who drives slowly and accelerates the hybrid vehicle at a reasonable rate. Therefore, another need exists in the art for tracking alternative energy consumption of hybrid vehicles in such a way that reasonable or efficient use of the alternative energy is rewarded more than inefficient use of the alternative energy.

Another problem with hybrid vehicles, and particularly PHEVs, is that many hybrid owners will have the option to upload excess energy from their vehicles that can be transferred back to the electric power grid. In other words, for those hybrid vehicles which have more electrical power than maybe needed by a driver for a particular day, such excess power may be sold by the driver back to the electric power grid. Alternatively, the excess electric power in an electric vehicle may be "siphoned off" by the electric vehicle while it is parked according to an energy exchange program that the driver of the electric vehicle may be participating in.

Such selling of excess alternative energy by the hybrid vehicle owner so that the owner may make more money with the excess energy that is sold should not be encouraged since there is a risk that the hybrid vehicle owner will power the vehicle on fossil fuel only when the owner can make more money by selling the excess alternative energy. Accordingly, there is a need in the art for a method and system which tracks vehicle to grid (V2G) uploads of energy and that will reduce the value of any energy credits that the owner may have earned through efficient use of the alternative energy.

Another problem exists in the art for tracking the amount of use of the hybrid vehicle when it is only powered by the alternative fuel. A need exists in the art for providing a system and method which tracks this use that cannot be altered or misused by a hybrid vehicle owner. A further need exists in the art for a method and system which can track alternative energy consumption where the value awarded for their alternative energy consumption may become part of the intrinsic value of the hybrid vehicle.

SUMMARY OF THE INVENTION

A system and method can track alternative fuel based travel in alternative fueled vehicles. According to one exemplary embodiment, the system can comprise an alternative fuel based odometer or "green odometer" which may track distance traveled while a hybrid vehicle, such as PHEV, is only powered by an alternative fuel or power, such as electricity. This green odometer can track credits or incentives earned since the last alternative fuel reimbursement or credit given to the vehicle owner as well as the total reimbursements or credits earned over an alternative fuel vehicle's life.

The green odometer may comprise its own central processing unit (CPU), memory, and a display device. The display device can present green credits that have been earned by the vehicle owner based on use of the alternative fueled vehicle when it has been powered only by an alternative fuel or power, like electricity.

The green odometer may be coupled to an intelligent controller that manages the alternative fuel for the alternative fueled vehicle. For example, in a PHEV, the green odometer may be coupled to a smart charger of the PHEV. The smart charger may comprise its own central processing unit and memory.

The smart charger or the green odometer (or both units) may be coupled to a fossil fuel engine use sensor. The fossil fuel engine use sensor can comprise one or more sensing devices. The fossil fuel engine use sensor can comprise a detector which senses exhaust gasses emitted by an internal combustion engine of the alternative fueled vehicle. The fossil fuel engine use sensor may also comprise a detector that senses electrical activity of the internal combustion engine of the alternative fueled vehicle. The fossil fuel engine use sensor may also comprise a detector that senses a change in the fossil fuel level of the internal combustion engine. The fossil fuel engine use sensor may further comprise a detector which senses if alternate energy, like electricity, has been uploaded or exported from the alternative fueled vehicle.

The fossil fuel engine use sensor may also comprise a detector that determines if alternative energy is being depleted from the alternative fueled vehicle. The fossil fuel use sensor may also comprise a detector which can sense whether the alternative energy source, like a battery, is operational.

The green odometer can be coupled to the fossil fuel engine use sensor so that the green odometer is inhibited from tracking any "green" or alternative fuel miles (distances traveled under power of the alternate energy source) if certain conditions are detected. For example, the green odometer may be inhibited from tracking green miles if the internal combustion engine is concurrently being used with the alternative energy. The green odometer in some instances may subtract green miles earned if certain other conditions are met. For example, if the alternative fuel vehicle is uploading alternative energy to outside of the vehicle, such as in an electric vehicle to grid (V2G) upload in which the vehicle owner is being reimbursed for the uploaded alternative energy, then the green odometer may subtract an amount of green miles earned which is proportional to the value of alternative energy being sold by the vehicle owner outside of the vehicle.

The green odometer may also execute or run an efficiency algorithm which awards more green miles to alternative fueled vehicle owners who operate their vehicles efficiently. For example, the green odometer can employ one or more algorithms which monitor acceleration and speed of the alternative fueled vehicle so that quick starts and operation of the vehicle at high speeds are discouraged by eliminating or reducing energy credits earned with the alternative fueled vehicle.

BRIEF DESCRIPTION OF THE DRAWINGS

FIG. 1A is a functional block diagram of a hybrid vehicle according to one exemplary embodiment of the invention.

FIG. 1B is a functional block diagram of a green odometer according to one exemplary embodiment of the invention.

FIG. 2 is a diagram illustrating a hybrid vehicle odometer according to one exemplary embodiment of the invention.

FIG. 3 is a diagram illustrating a hybrid vehicle odometer according to another exemplary embodiment of the invention.

FIG. 4 is a chart which shows how alternative fuel miles may be tracked according to one exemplary embodiment of the invention.

FIG. 5 is a logic flow diagram illustrating steps of an exemplary method for tracking alternative fuel miles of a hybrid vehicle according to one exemplary embodiment of the invention.

FIG. 6 is a logic flow diagram illustrating steps of an exemplary sub-method or routine of FIG. 5 for determining if a fossil fuel based engine has been activated according to one exemplary embodiment of the invention.

DETAILED DESCRIPTION OF EXEMPLARY EMBODIMENTS

Turning now to the drawings, in which like reference numerals referred to like elements, FIG. 1 is a functional block diagram of a hybrid vehicle 100 according to one exemplary embodiment of the invention. The hybrid vehicle 100 can comprise any type of hybrid vehicle 100 which uses alternate energy which is non-fossil-fueled based, such as electricity, to propel the vehicle 100. However, other energy sources beyond electricity are within the scope of the invention. The alternate energy storage unit 222 can comprise many forms of storage known to one of ordinary skill in the art. For example, the alternate energy storage unit 222 could comprise a power cell. However, according to one exemplary and preferred embodiment of the invention, the alternate energy storage unit 222 can be designed to specifically store electrical power and may take the form of either a battery, a plurality of batteries, a plurality of capacitors, or any combination thereof.

The hybrid vehicle 100 further comprises an antenna 106 that can transmit and receive wireless signals. The hybrid vehicle 100 can also include a wireless communication device 212 that is compatible with wireless communication devices that may be part of alternate fueling facilities, such as an electric charging facility. One preferred and exemplary communication protocol supported by the wireless communication device 212 can include the Zigbee standard communication protocol for radio frequency (RF) communications between the hybrid vehicle 100 and alternate fueling centers. However, other communication protocols and standards for radio frequency communications are not beyond the scope of the invention. For example, other communication protocols can include, but are not limited to, IEEE 802.11, Bluetooth, IEEE 802.16 (wireless WAN), and other like wireless communication protocols.

The hybrid vehicles 100 described herein can include hybrid electric vehicles, such as plug-in hybrid electric vehicles (PHEVs), especially vehicles that have significant storage battery capacity and that connect to the power grid for recharging a battery. The hybrid vehicles 100 described herein typically obtain some or all of their energy for motion and other purposes from the electric power grid. The hybrid vehicles 100 can be anyone of a class of hybrid electric vehicles such as plug-in hybrid electric vehicles (PHEVs) discussed above. PHEVs may have on board fossil fuel-based electric power generation such as a car engine or a fossil fuel generator.

The hybrid vehicle 100 may further comprise a central processing unit (CPU) 204A which is coupled to the wireless communication device 212. The central processing unit CPU 204A may also be coupled to a display 208A, memory 206A, a smart charger 214, and an alternate energy drive unit 209. The alternate energy drive unit 209 can comprise a motor and drive mechanism for converting the alternate energy in the energy storage unit 222 to power. The smart charger 214 may also be part of or may be physically housed in the hybrid vehicle 100.

The display 208A of the hybrid vehicle 100 can comprise any type of device which can display information to the operator or driver of the hybrid vehicle 100. According to one exemplary embodiment, the display 208A can comprise a liquid crystal display (LCD) or a light emitting diode (LED) display 208. However, other displays are not beyond the scope of the invention. Further, it is possible that the CPU 204A of the electric vehicle 100 could send display information to a display 208 of a wireless device that is operated by the driver of the electric vehicle 100. Such a device may include, but is not limited to, a personal digital assistant or a mobile phone which can include a display 208.

The memory 206A coupled to the CPU 204A and the memory 206B of the smart charger 214 of the hybrid vehicle 100 can comprise any type of machine-readable medium. Any machine-readable medium can include, but is not limited to, floppy diskettes, optical disks, CD-ROMs, magneto-optical disks, ROMs, RAMs, EPROMs, EEPROMs, magnet or optical cards, flash memory, or any other type of media/machine-readable medium suitable for storing electronic instructions for the CPUs 204, 216.

The CPU 204A of the hybrid vehicle 100 may also be coupled to a smart or intelligent charger 214. The smart or intelligent charger 214 may also comprise its own central processing unit 204B and its own memory 206B. However, one of ordinary skill in the art recognizes that the hybrid vehicle 100 may only comprise a smart charger that has its own CPU 204B and does not include a second or different CPU 204 for the entire vehicle 200. Various different embodiments in which the hybrid vehicle 100 only has the smart charger 214 with its central processing unit 204B without any other processing units are not beyond the scope of the invention. The smart charger 214 may also be coupled to the alternate energy storage unit 222.

The alternate energy storage unit 222 may comprise one or more batteries, super capacitors, other energy storage devices or any combination of the aforementioned energy storage devices for electric powered vehicles. The alternate energy storage unit 222 can be intermittently or permanently connected to an electric power grid and can provide dynamic input and output of power. The alternate energy storage unit 222 can function as a power source or a power load. However, it is envisioned that the alternate energy storage units 222 which are designed solely to be a power load (for charging a vehicle 200) and do not provide any energy back to the electric power grid may be supported. In non-electric exemplary embodiments, the alternate energy storage unit 222 can comprise a container for other non-fossil-based fuels, such as compressed natural gas (CNG), hydrogen, water, and the like for other alternate fueled vehicles like natural gas vehicles, fuel-cell vehicles, and the like.

The smart charger 214 can store in its memory 206B various parameters which relate to a specific alternate energy storage unit 222 of a particular hybrid vehicle 100. For example, such parameters can include the type of battery, as well as optimal charging loads and discharges as well as the current level of energy present in the alternate energy storage unit 222. The smart charger 214 may also convey such parameters like the amount of energy levels desired by the owner or operator of the hybrid vehicle 100, as well as the amount of energy that the owner or operator of hybrid vehicle 100 may be willing to shed or upload to the electric power grid through a vehicle-to-grid (V2G) upload. The smart charger 214 can be coupled to a receptacle 202 that can receive a connector (not illustrated) of a particular hybrid vehicle refueling infrastructure (not illustrated). The smart charger 214 may also support power line communications (PLCs) protocol such as the HomePlug protocol.

The HomePlug (1.0) protocol is a specification for home networking technology that couples devices to each other through power lines in a home. HomePlug certified products may couple personal computers and other devices such as chargers 214 for electric vehicles 200 that may also use other communication standards such as Ethernet, USB (Universal Serial Bus) and wireless local area network communications such as IEEE 802.11. Many devices may have the HomePlug standard built in such as the chargers 214. With the HomePlug standard built-in into a charger 214, to connect the charger 214 to a computer network, all that is required is to plug the charger 214 into an outlet of a wall in a home such that it may communicate with other devices that support the HomePlug standard.

Devices which support the HomePlug power line communication standard may function as transparent network bridges which may allow computers running on any operating system to use them for network access. The HomePlug communication standard supports the ability to use Ethernet in a bus topology in which it has carrier sense, multiple access and collision detection.

The smart charger 214 may be coupled to one or more fossil fuel or internal combustion (IC) engine use sensors 235. These IC engine or fossil fuel use sensors 235 can comprises various detector devices. The IC engine use sensor 235 can comprise a detector which senses exhaust gasses emitted by an internal combustion engine 230 of the alternative fueled vehicle. The IC engine use sensor 235 may also comprise a detector that senses electrical activity of the internal combustion engine 230 of the alternative fueled vehicle 100. The IC engine use sensor 235 may also comprise a detector that senses a change in the fossil fuel level of the internal combustion engine 230. The IC engine use sensor 235 may further comprise a detector which senses if alternate energy, like electricity, has been uploaded or exported from the alternative fueled vehicle 100.

The IC engine use sensor 235 may also comprise a detector that determines if alternative energy is being depleted from the alternative fueled vehicle 100. The IC engine use sensor 235 may also comprise a detector which can sense whether the alternative energy source 222, like a battery, is operational.

While the smart charger 214 is shown to be directly coupled to the IC engine use sensor 235, according to alternate exemplary embodiments (not illustrated) the green odometer 200 may be coupled directly to the IC engine use sensor 235. The green odometer 200 may comprise several hardware and software components to support its operation.

Referring now to FIG. 1B, this Figure is a functional block diagram of a green odometer 200 according to one exemplary embodiment of the invention. The green odometer 200 can comprise a central processing unit (CPU) 204C, a display 208B, and memory 206C. The CPU 204C of the green odometer 200 may be coupled to both the display 208B and the memory 206C. The memory 206C can store an efficiency algorithm or program 211 which can be executed by the CPU 204C. The efficiency algorithm 211 can determine how efficient the vehicle owner is using the hybrid vehicle 100 when it is powered by the alternate energy source. The efficiency algorithm can track speed, acceleration, distance traveled, and other parameters in order to calculate how efficient the alternative energy source of the hybrid vehicle is being used by the operator.

The display device 208B of the green odometer 200 can present green credits that have been earned by the vehicle owner based on use of the alternative fueled vehicle 100 when it has been powered only by an alternative fuel or power, like electricity. This green odometer 200 can track credits or incentives earned since the last alternative fuel reimbursement or credit given to the vehicle owner as well as the total reimbursements or credits earned over an alternative fuel vehicle's life. The credits or incentives measured and displayed can be in the form of any type of units. According to one exemplary embodiment, the units can comprise monetary currency such as American dollars.

The CPU 204C can monitor current values of incentives or energy credits through using the wireless communication device 212. The CPU 204C can use one or more rules or formulas to translate distance traveled, an amount of alternate energy consumed, and efficiency of alternative energy use into the credits or incentives which are displayed to the operator of the alternative fueled vehicle.

The green odometer 200 monitor the signals from the IC engine use sensor(s) 235 so that the green odometer 200 is inhibited from tracking any "green" or alternative fuel miles if certain conditions are detected. For example, the green odometer 200 may be inhibited from tracking green miles if the internal combustion engine 230 is concurrently being used with the alternative energy. The green odometer 200 in some instances may subtract green miles earned if certain other conditions are met. For example, if the alternative fuel vehicle 100 is uploading alternative energy to outside of the vehicle, such as in an electric vehicle to grid (V2G) upload in which the vehicle owner is being reimbursed for the uploaded alternative energy, then the green odometer 200 may subtract an amount of green miles earned which is proportional to the value of alternative energy being sold by the vehicle owner outside of the vehicle 100.

Referring now to FIG. 2, this Figure is a diagram illustrating a hybrid vehicle odometer 200A according to one exemplary embodiment of the invention. This odometer 200A can comprise an analog gauge that has a speed pointer 298 and speed level markings 295. The speed level markings 295 can be in any number of units for measuring speed, such as miles per hour (MPH) or Kilometers per hour (KPH). The odometer 200A can further comprise the display 208B which provides number of green credits that have been earned by the vehicle operator based on distance traveled as well as efficiency in using alternate energy to power the vehicle 100. The green credits measured and displayed can be in the form of any type of units. According to one exemplary embodiment, the units can comprise monetary currency such as American dollars. The odometer 200A can further comprise a conventional distance traveled display 280 which lists the amount of distance traveled by the vehicle 100 in the preferred units of measure, such as in total miles or kilometers traveled.

Referring now to FIG. 3, this Figure is a diagram illustrating a hybrid vehicle odometer 200B according to another exemplary embodiment of the invention. The hybrid vehicle odometer 200B in this exemplary embodiment may have a current green credits earned display 208B as well as a total green credits earned over the life of vehicle display 208C. The current green credits earned display 208B may indicate the number of green credits earned since the last reimbursement that was made by the operator of the hybrid vehicle 100. This green credits earned display 208B can be reset each time the operator of the hybrid vehicle 100 wants to redeem or turn in the green credits earned for the operator's government or private sponsor incentives.

Green credits can be easily redeemed by the operator in an electronic manner in which the green odometer 200 may use the wireless communication device 212 in order to transmit the green credits earned to a reimbursement facility. The green odometer 200 can track in its memory 206C a running log of all reimbursements of green credits that have been made over the hybrid vehicle's life. This log can track date, time, amount of green credits transferred, and the government or private entity that received the green credits.

The total green credits display 208C can display the aggregate sum of all green credits that have been earned by the hybrid vehicle 100. The total green credits can be permanently stored and tracked in the memory 206C of the green odometer 200. These total green credits can be preserved as the intrinsic market value of the hybrid vehicle 100. Government or private entities can assign a separate value to the total green credits earned by a vehicle 100 so that the owner of the vehicle 100 may be rewarded additional value for the vehicle 100 when the owner desires to sell the vehicle.

The green odometer displays 208B, 208C can be provide in the dashboard of the hybrid vehicle 100. These displays 208B, 208C may also be transmitted to any computer or handheld device through the wireless communication device 212 and antenna 106.

Referring now to FIG. 4, this figure is a chart 400 which shows how alternative fuel miles may be tracked according to one exemplary embodiment of the invention. In this exemplary embodiment, the alternate fueled vehicle 100 is assumed to have an energy efficiency of 200 Watt-hour/mile. The Vehicle Useable Battery capacity is assumed to be ten kilowatt hours and can be fully charged every night. The maximum power transfer for charge is three kilowatt hours—from empty state of the energy storage unit 222 to a full state for the energy storage unit 222.

Further, for this exemplary scenario illustrated in FIG. 4, it is assumed that the daily weekday commute for the operator of the electric vehicle 100 is twenty miles round trip. If the operator commutes at least five days a week, this translates into one hundred miles a week and 5,200 miles per year. It is further assumed that the operator of the alternate fueled vehicle 100 travels one hundred miles a day each weekend day for two days. This translates into two hundred miles a weekend or an additional 10,400 miles a year. However, one of ordinary skill in the art will appreciate that the aforementioned driving parameters and efficiency parameters of the electric vehicle 100 can be varied without departing from the scope of the invention.

Referring to the chart 400, the second column 405 lists the total alternate fuel miles or "E" or electric miles driven. The first column 410 lists the total fossil fuel or "F" miles driven without using the alternate fuel and by using fossil fuels burned in the internal combustion engine 230. Given the assumed driving parameters above, the total of two-hundred e-miles are driven as denoted by reference numeral 415. Reference numeral 420 denotes the total miles driven by the operator of the alternate fuel vehicle 100 which includes both "E" miles driven on alternate fuel and "F" miles driven on fossil fuel.

Assuming that one exemplary incentive for "E" miles driven is a reward comprising an amount of twenty cents per "E" mile driven, then in this exemplary embodiment illustrated in FIG. 4, the operator would be awarded 0.20×20 E-miles driven=$40 (Forty) U.S. Dollars. One of ordinary skill in the art will appreciate that other currencies, rewards, incentives, and amounts are not beyond the scope of the invention.

One of the interesting vehicle operator behavior changes that this may impact would be the willingness of vehicle operators to make their daily commute a bit longer to support a car pool, which would extend the miles driven on alternate fuel during the week because of the spare capacity available. For example, in the specific and exemplary embodiment of an hybrid electric vehicle, by adding a five mile additional circuit to pick up and return another passenger, the vehicle operator can achieve a one dollar per week payment.

Another interesting aspect of this system is the offset to depreciation that recording all "green" miles traveled by the alternate fuel vehicle 100 on alternate fuel with the green odometer 200 offers to the vehicle owner. By maintaining this data onboard with the vehicle 100, at the time of sale or lease termination, the credit value can be actually preserved as part of the intrinsic market value of the vehicle 100. This offers many opportunities to develop and sell management systems to automobile dealers and other service centers to handle this.

The data stored in the green odometer 200 could be accessed in a read only manner and could be streamed in a wireless manner using the antenna 106 and wireless communication device 212 into a Wattspot portal for residential energy management. In this way, the vehicle operator would know the "balance" of their credits for the green miles traveled with the vehicle 100. Ultimately, this data could be electronically integrated with a transaction/market process to allow for monetization of the credited amount (ie "cashed out"). When a cash out occurs, the green odometer 200 could be "cleared" and reset to zero (or reduced by the amount of cash out).

This would require a secure bidirectional link and data overwriting capability of the on-board system 200. Transaction histories could be maintained to support audits, dispute resolutions, etc. with respect to the total green miles tracked with the green odometer 200.

Referring now to FIG. 5, this figure is a logic flow diagram illustrating steps of an exemplary method 500 for tracking green miles of an alternate fueled vehicle 100 according to one exemplary embodiment of the invention. One of ordinary skill in the art will appreciate that the process functions of green odometer 200 may be executed by on or more different devices that include firmware code executing on a microcontroller, microprocessor, a DSP, or state machines implemented in application specific or programmable logic, or other numerous forms without departing from the spirit and scope of the invention.

In other words, these steps illustrated in FIG. 5 and other logic flow diagrams of this disclosure maybe provided as a computer program which may include a machine-readable medium having stored there on instructions which maybe used to program a computer (or other electronic devises) to perform a process according to the invention. The machine-readable medium may include, but is not limited, floppy diskette, optical disk, CD-ROM, magneto-optical disks, ROMs, RAMs, EEPROMs, EEPROMs, magneto-optical cards, flash memory, or other type of medias/machine-readable mediums suitable for storing electronic instructions.

In addition to the different types of hardware and software that may be selected to execute the steps of the invention, one of ordinary skill in the art recognizes that the steps in the processes or process flow described in all of the logic flow diagrams referred to in this specification must naturally precede others for the invention to function as described. However, the invention is not limited to the order of the steps described if such order or sequence does not alter the functionality of the present invention. That is, one of ordinary skill in the art recognizes that some steps may perform before, after, or parallel other steps without departing from the scope and spirit of the invention. Further, one of ordinary skill and programming would be able to write such a computer program or identify appropriate hardware at circuits to implement the disclosed invention without difficulty based on the flow charts and associated description in the application text, for example.

Therefore, disclosure of a particular set of program code instructions or detailed hardware devices is not considered necessary for an adequate understanding of how to make and use the invention. The inventive functionality of the claimed computer implemented processes would be explained in more detail in the following description and in conjunction with the remaining figures illustrating other process flows.

Referring again to FIG. 5, routine 505 is the first part of the method 500 in which the green odometer 200 can check the sensors 235 which are coupled to the internal combustion engine 230 and the alternative power source 209, 222 are active. Also in this routine, the green odometer 200 can also check to see if any alternate energy has been exported from the vehicle 100, such as in an vehicle-to-grid (V2G) upload. One of ordinary skill in the art recognizes that while the green odometer 200 can actively ping sensors 235, the sensors 235 may also forward status information to the green odometer 200 without receiving any requests from the green odometer 200 for information. Further details of routine 505 will be described below in connection with FIG. 600.

After routine 505, in decision step 510, the green odometer 200 can assess the information that it receives in routine 505. The green odometer 200 can determine if the internal combustion engine 230 is active.

If the inquiry to decision step 510 is negative, then the "No" branch is followed to decision step 520. If the inquiry to decision step 510 is positive, then the "Yes" branch is followed to step 515. In step 515, the green odometer 200 is inhibited from tracking of any green or "alternate fuel" miles even if the alternative vehicle power, like electricity, is active at the same time as the internal combustion engine 230. In this way, the operator of an alternate fueled vehicle 100 will not be awarded any green or environmental credits if the internal combustion engine 230 is being used to power the vehicle 100. After step 515, the process returns back to decision step 510.

In decision step 520, the green odometer 200 can determine if the alternative power source, which is usually a non-fossil based fuel like electricity, is active. In this step 200, the green odometer 200 can check the status of the energy storage unit 222 and the electric drive unit 209. Sensors (not illustrated) may be coupled to the energy storage unit 222 and the electric drive unit 209. If the inquiry to decision step 520 is positive, then the "Yes" branch may be followed to step 525. If the inquiry to decision step 520 is negative, then the "No" branch may be followed to decision step 530.

In step 525, the green odometer 200 may start tracking green or alternate fueled miles which are traveled by the alternate fueled vehicle 100. The green odometer 200 may be coupled to the drive train, transmission, and/or sensors (not illustrated) that measure the distance traveled by the vehicle 100. The green odometer 200 may track and store the current distance traveled since a previous event such as when an operator "cashes-out" or is awarded earned green energy credits. The green odometer 200 may also track and store the total amount of green distance traveled by the vehicle 100 over the vehicle's life. This total value awarded over the life of the vehicle 100 for the alternative energy consumed to power the vehicle 100 may become part of the intrinsic value of the vehicle 100.

Next in decision step 530, the green odometer 200 can determine if energy from the alternative vehicle power source has been uploaded to a storage unit or to some location outside of the vehicle 100. In this step, the green odometer 200 may either check the smart charger 214 or the energy storage unit 222 to determine if the operator of the vehicle 100 is uploading alternate energy to outside of the vehicle, such as in a vehicle-to-grid (V2G) upload for an electric upload.

If the inquiry to decision step 530 is negative, then the "No" branch is followed back to step 505. If the inquiry to decision step 530 is positive, then the "Yes" branch may be followed to step 535.

In step 535, the green odometer 200 may subtract an equivalent amount of green credits awarded for alternate fuel travel for the amount of energy that was uploaded or loaded to a location external to the vehicle 100. With this step 535, the green odometer can help discourage operators of vehicles 100 from trying to make a profit from selling alternate energy rather than using the alternate energy to operate and power the alternate fueled vehicle 100. The green odometer 200 may execute certain algorithms and certain sensors (not illustrated) which measure the amount of alternate energy that is exported from the vehicle 100. In some exemplary embodiments, the smart charger 214 may already have this functionality of tracking uploaded or exported energy built-in so that the green odometer 200 only needs to request this information from the smart charger 214. After step 535, the process 500 returns back to step 505.

Referring now to FIG. 6, this figure is a logic flow diagram illustrating steps of an exemplary sub-method or routine 505 of FIG. 5 for determining if a fossil fuel based engine has been activated or if energy has been exported from the vehicle 100 according to one exemplary embodiment of the invention. Step 605 is the first step of the process in which a sensor 235 can detect exhaust gases generated by the internal combustion engine 230. The sensor 235 can comprise any one of a number of gas detectors known to one of ordinary skill in the art, such as a carbon monoxide detector. In this step, the green odometer 200 can send a request to the sensor 235 or if the sensor detects a gas, the sensor 235 can alert the green odometer 200 of this event. Next in step 610, a sensor 235 (which is different from the sensor described in step 605) may detect electrical activity of the internal combustion engine 230. For example, the sensor 235 may detect the electrical activity of the coils, distributor cap, and/or spark plug wires of the internal combustion engine 230. In this step, the green odometer 200 can send a request to the sensor 235 or if the sensor detects any electrical activity of the internal combustion engine 230, the sensor 235 can alert the green odometer 200 of this event.

In step 615, the sensor 235 (which is different from the sensors described in steps 605 and 610) may detect a change in the fuel level for the internal combustion engine 230. For example, the sensor 235 can monitor a fuel gauge or the sensor may comprise hardware similar to a fuel gauge. In this step, the green odometer 200 can send a request to the sensor 235 or if the sensor detects any change in a fuel level for the internal combustion engine 230, the sensor 235 can alert the green odometer 200 of this event.

In step 620, the sensor 235 (which is different from the sensors described in steps 605, 610, and 615) may detect if any alternate energy has been exported from the vehicle 100. This sensor 235 may be coupled to the energy storage unit 222. According to an exemplary embodiment, the energy storage unit 222 may store electricity. The sensor 235 can detect a condition in which electrical energy is leaving the energy storage unit 222 while not powering the electric drive unit 209. Alternatively, the sensor 235 may be coupled to the receptacle 202 and can detect any electricity flowing out of the vehicle 100 through the receptacle 202. Electricity may flow out of the vehicle 100 through the receptacle 202 during a vehicle-to-grid (V2G) upload. In this step, the green odometer 200 can send a request to the sensor 235 or if the sensor detects an export of energy relative to the vehicle 100, the sensor 235 can alert the green odometer 200 of this event.

In step 625, the sensor 235 (which is different from the sensors described in steps 605, 610, 615, and 620) may detect if energy in the energy storage unit 222 is being depleted. This means the sensor 235 can detect if energy levels within the energy storage unit 222 are changing. This sensor 235 for detecting energy levels of the energy storage unit 222 may work in conjunction with any of the other sensors 235, such as the sensors 235 which may detect emission gases from the internal combustion engine 230. This sensor combination may be needed since it is possible to deplete or use energy from the energy storage unit 222 without necessarily moving or driving the vehicle 100.

For example, an operator of the vehicle 100 could power a radio from the energy storage unit 222 without actual driving or moving the vehicle 100. By sensing energy leaving the energy storage unit 222 and by sensing emission gasses or if the electric drive unit 209 is active, then the green odometer 200 would know that the alternate energy being used is for moving the vehicle 100. In this step, the green odometer 200 can send a request to the sensor 235 or if the sensor 235 detects a change in energy level in the storage unit 222, the sensor 235 can alert the green odometer 200 of this event.

Subsequently, in step 630, a sensor 235 may detect if the alternate energy source 222 is operational. In this step 630, a sensor 235 may be able to test the energy storage unit 222 or the electric drive unit 209 or other components (or a combination thereof) to determine if the alternate energy source for the vehicle 100 may be used by an operator to move the vehicle. This sensor 235 may be able to initiate self tests of various equipment to determine if such equipment is operational and ready to receive commands for moving the vehicle 100. In this step, the green odometer 200 can send a request to the sensor 235 or if the sensor 235 detects an error in hardware for the alternate energy source, the sensor 235 can alert the green odometer 200 of this event. The process then returns to decision step 510 of FIG. 5.

One of ordinary skill in the art recognizes that a single, a plurality, various combinations, and all steps in routine or submethod 505 may be executed by the system with out departing from the scope of the invention. It is envisioned that at least several steps of submethod 505 may be used to accurately determine the state of an internal combustion engine 230 of the vehicle 100.

Alternative embodiments of the method and system for tracking distances traveled by an alternate fueled vehicle 100 using alternate fuel will become apparent to one of ordinary skill in the art to which the invention pertains without departing from its spirit and scope. Thus, although this invention has been described in exemplary form with a certain degree of particularity, it should be understood that the present disclosure is made only by way of example and that numerous changes in the details of construction and the combination and arrangement of parts or steps may be resorted to without departing from the scope or spirit of the invention. Accordingly, the scope of the present invention may be defined by the appended claims rather than the foregoing description.

What is claimed is:

1. A system for tracking distance traveled by an alternate fueled vehicle using an alternate fuel comprising:
   programmable circuitry for tracking a distance traveled by the alternate fueled vehicle while under power by only an alternate fuel, the alternate fuel comprising an energy source other than gasoline which powers the alternate fueled vehicle for the distance traveled; the programmable circuitry calculates an alternative fuel credit value associated with the distance traveled by the alternate fueled vehicle while under power by only the alternate fuel;
   an energy storage unit coupled to the programmable circuitry, the energy storage unit storing the alternate fuel;
   an internal combustion engine;
   an internal combustion engine sensor coupled to the programmable circuitry and to the internal combustion engine, the internal combustion engine sensor detecting when the internal combustion engine is being used to power the alternate fueled vehicle for the distance traveled by the alternate fuel vehicle; and
   a display coupled to the programmable circuitry for displaying the alternative fuel credit value calculated by the programmable circuitry while the alternate fuel vehicle is in operation, the alternative fuel credit value being visible within a driving compartment of the alternate fuel vehicle and located adjacent to a speed indicator for the alternate fuel vehicle to provide a real-time alternative fuel credit value, the alternative fuel credit value changes in accordance with the distance traveled by the alternate fueled vehicle while under power by only an alternate fuel, the speed indicator changes in accordance with any changes of speed of the alternate fueled vehicle, the alternative fuel credit value comprises a monetary value associated with a government currency presented as a numerical value on the display.

2. The system of claim 1, wherein the alternate fuel comprises one of electricity, natural gas, hydrogen, and a combustible gasoline alternative liquid.

3. The system of claim 1, wherein the distance traveled by the alternate fueled vehicle using only an alternate fuel is presented on the display.

4. The system of claim 1, wherein the internal combustion engine sensor comprises a detector for detecting gasses produced by the internal combustion engine.

5. The system of claim 1, wherein the internal combustion engine sensor comprises a detector for detecting electrical activity of the internal combustion engine.

6. The system of claim 3, wherein the internal combustion engine sensor comprises a detector for detecting electrical activity of the internal combustion engine.

7. The system of claim 1, wherein the internal combustion engine sensor comprises a detector for detecting a fossil fuel level of the internal combustion engine.

8. The system of claim 1, wherein the internal combustion engine sensor comprises a detector for detecting a energy exports from the alternate fueled vehicle.

9. The system of claim 1, wherein the internal combustion engine sensor comprises a detector for detecting if an alternate fuel source is being depleted.

10. The system of claim 1, wherein the internal combustion engine sensor comprises a detector for detecting if an alternate energy source of the alternate fueled vehicle is active.

11. The system of 9, wherein the currency comprises one or more U.S. dollars or fractions thereof.

12. The system of 1, wherein the currency comprises one or more U.S. dollars or fractions thereof.

13. The system of claim 12, wherein the distance traveled by the alternate fueled vehicle using only an alternate fuel is presented on the display.

14. The system of claim 11, wherein the distance traveled by the alternate fueled vehicle using only an alternate fuel is presented on the display.

* * * * *